US010453357B2

(12) United States Patent
Su

(10) Patent No.: US 10,453,357 B2
(45) Date of Patent: Oct. 22, 2019

(54) INTELLIGENCE TOY USED WITH GRAPH CARDS

(71) Applicant: Ping-Hung Su, New Taipei (TW)

(72) Inventor: Ping-Hung Su, New Taipei (TW)

(73) Assignee: Lonpos Braintelligent Co., Ltd., New Taipei (TW)

( * ) Notice: Subject to any disclaimer, the term of this patent is extended or adjusted under 35 U.S.C. 154(b) by 252 days.

(21) Appl. No.: 15/672,239

(22) Filed: Aug. 8, 2017

(65) Prior Publication Data

US 2019/0051213 A1 Feb. 14, 2019

(51) Int. Cl.
| | |
|---|---|
| G09B 19/22 | (2006.01) |
| A63F 9/12 | (2006.01) |
| A63F 9/08 | (2006.01) |
| A63F 3/00 | (2006.01) |
| A63F 9/06 | (2006.01) |

(52) U.S. Cl.
CPC ............... *G09B 19/22* (2013.01); *A63F 9/12* (2013.01); *A63F 9/08* (2013.01); *A63F 2003/0081* (2013.01); *A63F 2003/00328* (2013.01); *A63F 2003/00356* (2013.01); *A63F 2003/00794* (2013.01); *A63F 2009/0698* (2013.01); *A63F 2009/1236* (2013.01)

(58) Field of Classification Search
USPC ...... 434/128, 129; 273/156, 157 R, 273, 287, 273/288
See application file for complete search history.

(56) References Cited

U.S. PATENT DOCUMENTS

| | | | | |
|---|---|---|---|---|
| 2,900,190 | A * | 8/1959 | Pestieau | A63F 9/10 273/157 R |
| 4,844,466 | A * | 7/1989 | Johnson | A63F 9/12 273/157 R |
| 4,974,849 | A * | 12/1990 | Kasuya | A63F 9/10 273/157 R |
| 5,823,533 | A * | 10/1998 | Edwards | A63F 9/12 273/160 |
| 6,352,475 | B1 * | 3/2002 | Mraovic | G09B 19/00 273/153 P |
| 6,666,453 | B2 * | 12/2003 | Chambers | A63F 9/10 273/156 |
| 6,708,973 | B1 * | 3/2004 | Hall, Jr. | A63F 3/00176 273/157 R |

(Continued)

OTHER PUBLICATIONS

"Teacher's Guide to Rush Hour", Jun. 27, 2002 [retrieved online May 22, 2019]. (Year: 2002).*

*Primary Examiner* — Kurt Fernstrom

(57) ABSTRACT

An intelligence toy used with graph cards, comprising: a base, a building block base, a building block set, and at least one graph card. The building block base includes twenty five perforations, the building blocks consist of six different building blocks, each consisting of 3 to 5 block units, and the graph card includes at least one mark, the mark corresponds to the perforation of the building block base above and is visible through the perforation, and then the six building blocks are arranged in the twenty five perforations of the building block base corresponding to the marks, whereby a variety of games are displayed through the different marks displayed on the graph card, providing to young children aged 3-6 in order to understand and operate, and to achieve the effect of inspired intelligence.

10 Claims, 9 Drawing Sheets

(56) References Cited

U.S. PATENT DOCUMENTS

| | | | | |
|---|---|---|---|---|
| 6,910,691 | B2* | 6/2005 | Shih | A63F 9/1204 |
| | | | | 273/157 R |
| 7,040,621 | B2* | 5/2006 | Cheng | A63F 9/12 |
| | | | | 273/157 R |
| 7,140,612 | B2* | 11/2006 | Chen | A63F 9/12 |
| | | | | 273/156 |
| 8,020,867 | B2* | 9/2011 | Cheng | A63F 9/10 |
| | | | | 273/156 |
| 8,020,870 | B2* | 9/2011 | Robuck, Jr. | A63F 9/0613 |
| | | | | 273/155 |
| 8,632,072 | B2* | 1/2014 | Loveland | A63F 9/1204 |
| | | | | 273/157 R |
| D759,166 | S * | 6/2016 | Fox | D21/480 |
| 9,427,675 | B2* | 8/2016 | Yang | A63H 33/04 |
| 9,937,410 | B2* | 4/2018 | Greenawalt | A63F 3/00574 |
| 10,105,590 | B2* | 10/2018 | Sonnenfeld | A63F 3/00097 |
| 2008/0274665 | A1* | 11/2008 | Cheng | A63H 33/08 |
| | | | | 446/118 |

* cited by examiner

INTELLIGENCE TOY USED WITH GRAPH CARDS

BACKGROUND OF INVENTION

1. Field of the Invention

The present invention relates generally to the technical field of intelligence toys, and more particularly to an intelligence toy used with graph cards.

2. Description of Related Art

The applicant developed diversified intelligence toys before the application for the present invention, and obtained patents successively. However, none of previous intelligence toys was a game box with graph cards, but used question book to adjust the difficulty level. As the previous intelligence toy devices are presented in comparison to the question book, namely, the building blocks are assembled in the box after referring to the solution of question book, this is easy for the children above elementary school and adults to understand and operate, but difficult for the 3-6 years old children. Therefore, the topic of the present invention is to let the preschool children, especially 3-6 years old children, comprehend and handle intelligence toys, and to diversify the games, to enhance the entertaining quality, to make different difficulty levels, and to increase the learning interest.

SUMMARY OF THE INVENTION

The object of the present invention is to provide an intelligence toy used with graph cards for preschool children, especially children aged 3-6, and creating a puzzle game toy.

The technical scheme is an intelligence toy used with graph cards, comprising:

a base which is a quadrangular bottom plate, including three connected and upward vertical sidewalls on rear, left and right sides thereof, and a plurality of locating holes in a lower part of an inner wall of the three sidewalls;

a building block base which is a quadrangular top plate, including three connected and downward vertical sidewalls on rear, left and right sides thereof; wherein the building block base can be placed on the base and is enclosed by the three sidewalls of the base; the three sidewalls of the building block base are vertically placed on the bottom plate and retain a space between the top plate and bottom plate to form a holding space; the bottom plate and top plate form an opening disposed at front sides thereof; the three sidewalls of the building block base having an outer side is attached to an inner side of the three sidewalls of the base and the outer side of the three sidewalls includes a plurality of clamping blocks configured to fix into the locating holes; the top plate has a crosswise spread bracket, which forms twenty five perforations arrayed in square matrix;

a building block set being composed of six building blocks A~F and each building block be composed of three to five block units, wherein the block units are horizontally and vertically combined, and every two block units are connected by a narrow neck; the building block set has twenty five units, which can be laid in the twenty five perforations of the building block base; the six building blocks A~F include a lug on each outer wall of the block unit, which allows each block unit to fall into the perforations and be blocked by the bracket without falling off; and at least one graph card which is a quadrangular card and is placed on the bottom plate in the holding space, including at least one mark printed on a surface thereof, wherein the mark corresponds to the perforation of the building block base above and is visible through the perforation.

More preferably, wherein the six building blocks A~F include a building block A having three block units, which are unit A1~unit A3, wherein the first unit A1 and the second unit A2 are connected on horizontal axis X; the first unit A1 and the third unit A3 are connected on vertical axis Y; the perpendicular intersection of X-axis and Y-axis is in the first unit A1;

a building block B having four block units, which are unit B1~unit B4, wherein the first unit B1 to the third unit B3 are connected on vertical axis Y; the third unit B3 and the fourth unit B4 are connected on horizontal axis X; the perpendicular intersection of X-axis and Y-axis is in the third unit B3;

a building block C having four block units, which are unit C1~unit C4, wherein the first unit C1 to the third unit C3 are connected on horizontal axis X; the second unit C2 and the fourth unit C4 are connected on vertical axis Y; the perpendicular intersection of X-axis and Y-axis is in the second unit C2;

a building block D has having block units, which are unit D1~unit D5, wherein the first unit D1 to the third unit D3 are connected on a first vertical axis Y1; the fourth unit D4 and the fifth unit D5 are connected on a second vertical axis Y2; the second unit D2 and the fourth unit D4 are connected on a first horizontal axis X1; the third unit D3 and the fifth unit D5 are connected on a second horizontal axis X2; The first vertical axis Y1 is parallel to the second vertical axis Y2; the first horizontal axis X1 is parallel to the second horizontal axis X2;

a building block E having five block units, which are unit E1~unit E5, wherein the first unit E1 and the second unit E2 are connected on the first vertical axis Y; the third unit E3 and the fourth unit E4 are connected on the second vertical axis Y2; the second unit E2 and the third unit E3 are connected on the first horizontal axis X1; the fourth unit E4 and the fifth unit E5 are connected on the second horizontal axis X2; the first vertical axis Y1 is parallel to the second vertical axis Y2; the first horizontal axis X1 is parallel to the second horizontal axis X2;

a building block F having four block units, which are unit F1~unit F4, wherein the first unit F1 and the second unit F2 are connected on the first vertical axis Y1; the third unit F3 and the fourth unit F4 are connected on the second vertical axis Y2; the second unit F2 and the third unit F3 are connected on the horizontal axis X; the first vertical axis Y1 is parallel to the second vertical axis Y2.

The intelligence toy used with graph cards, including a top cover fitting the bottom plate for covering the building block base, a blocking plate extending downward from a front side of the top cover or shielding the opening, and pivots disposed at both ends of a rear side of the top cover, wherein the pivots are respectively pivotally connected with vertical pivot slots disposed at both ends of a rear side of the bottom plate.

More preferably, wherein the bottom plate of the base includes an open and backward extended gap disposed at the front side thereof, and recessed shallow slots disposed at right and left sides of the gap respectively; the blocking plate includes two stoppers disposed on an inner wall of a bottom edge thereof and configured to be fixed into the shallow slots, and a convex shifting block disposed on the inner wall of the bottom edge thereof, arranged between the two stoppers, and corresponding to and can be inserted into the gap.

More preferably, wherein the top cover includes a plurality of through holes disposed in a surface of the top cover for visually observing the six building blocks A~F on the building block base.

More preferably, wherein the base includes undulating anti-slip walls disposed on an external surface of two sidewalls.

More preferably, wherein the three sidewalls of the base include small lugs disposed on the lower inner wall thereof and arranged between two locating holes; the three sidewalls of the building block base include small grooves disposed at the lower outer wall thereof and arranged between two clamping blocks; the small lugs correspond to and are fixed to the small grooves.

More preferably, wherein the base includes a hand grip disposed on the rear side thereof; both ends of the hand grip are integrated with the base.

More preferably, wherein the mark is one of the following: when in game, the mark is used as a color block, indicating the positions of the building blocks A~F and being the same color as the building blocks; or the mark is used as a pattern, hindering the placement of the building blocks A~F.

More preferably, wherein the graph card includes a symbol printed at a corner of a surface thereof, wherein the quantity of the symbol represents the degree of difficulty of the game; and a serial number printed on one side of the symbol for indicating the arrangement of the graph card.

In comparison to the existing technology, the functions and effects of the present invention are:

No. 1: the implementation of building blocks and graph cards of the present invention diversifies the game, there are different difficulty levels, especially easy for 3-6 years old preschool children to comprehend and handle, they will be interested in learning, so as to develop intelligence.

No. 2: the perforations in the building block base of the present invention are square holes arrayed in matrix, and there are 25 perforations. The building block set comprises 6 different building blocks, each building block comprises 3~5 block units combined vertically and horizontally. The total number of units is exactly 25. There are 25 marks on the graph card, which are arranged in square matrix. The coordination of the perforations, building block units and marks leads to different arrangement modes of building block sets, so as to implement special and interesting brain development.

No. 3: the base and building block base of the present invention are clamped by their locating holes and clamping blocks, and the small lugs and small slots are clamped, implementing dual clamping and positioning, so as to prevent the two bases from moving or separating.

No. 4: the building block set of the present invention is placed on the building block base, which can be covered with top cover for protection, dust prevention and to avoid losses. Furthermore, there are multiple punch holes in the top cover, for the user to observe the 6 building blocks on the building block base as inspection.

DETAILED DESCRIPTION OF THE INVENTION

Figure 1:
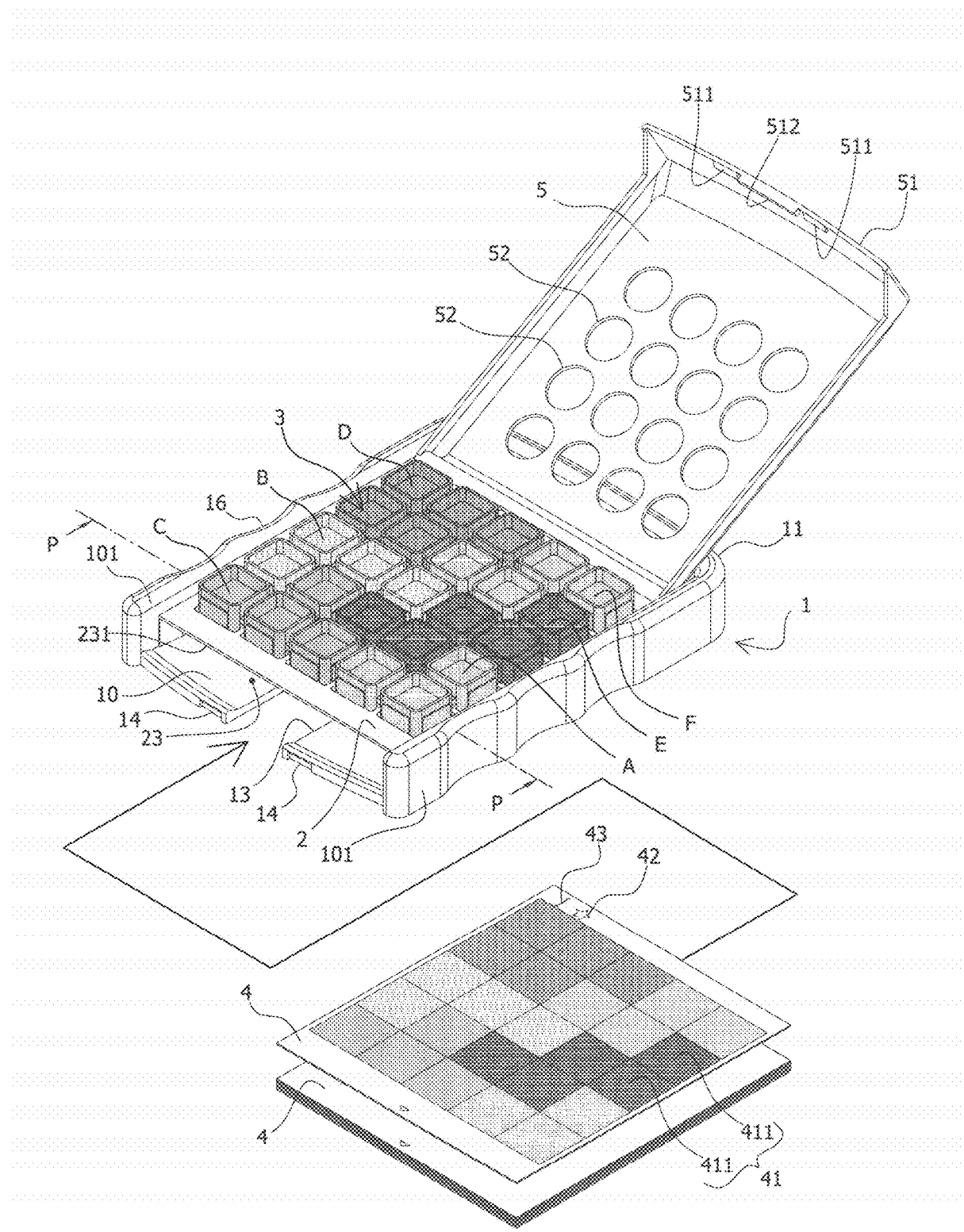
FIG. 1 is a perspective schematic diagram of an intelligence toy and graph cards of the present invention.
Figure 2:
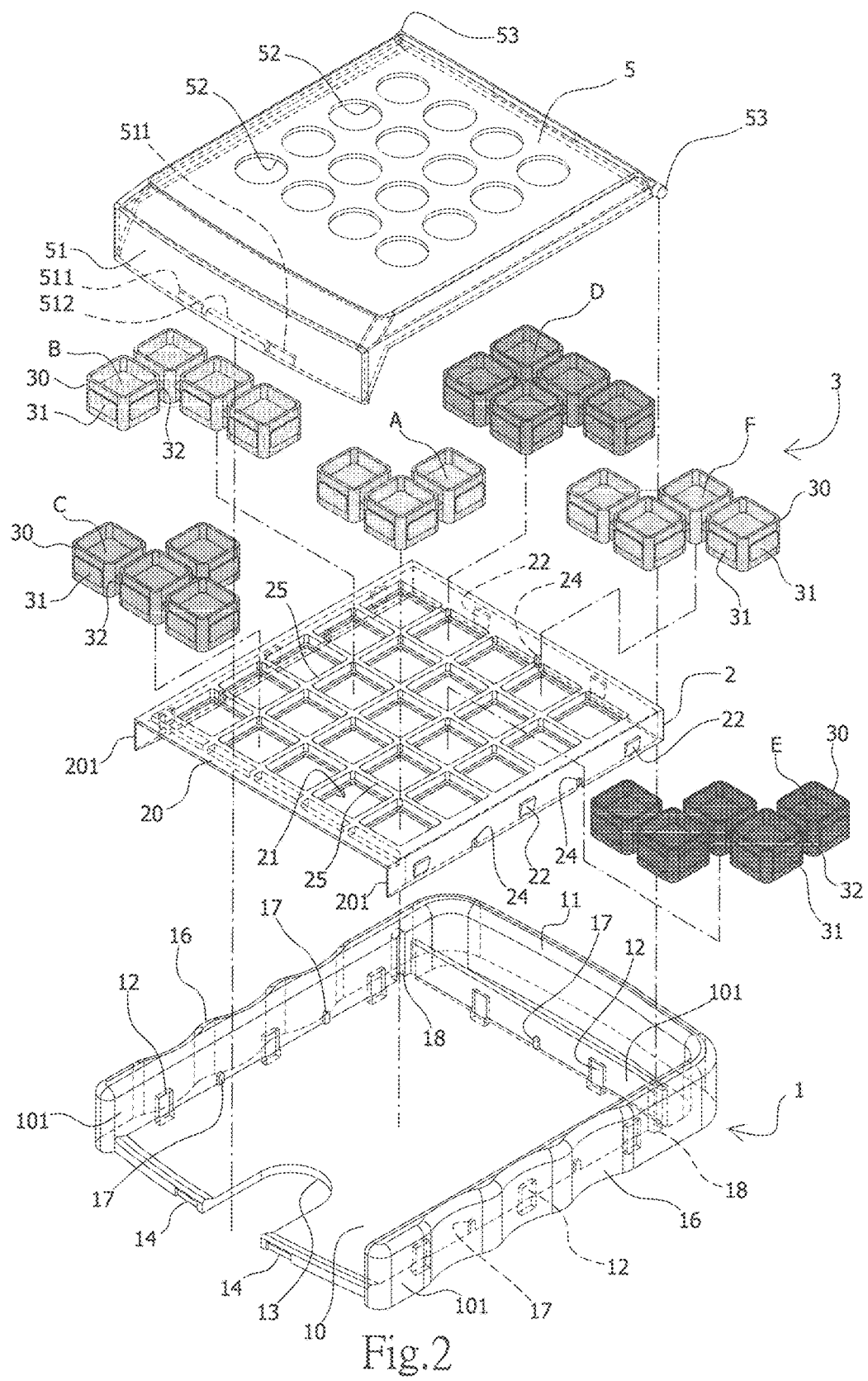
FIG. 2 is an exploded view of the intelligence toy of the present invention.

The embodiments shown in the figures are elaborated below:

FIG. 1 and FIG. 2 show an intelligence toy used with graph cards, including a base (1), a building block base (2), a building block set (3) and at least one graph card (4). The structure is described below.

The base (1) is a quadrangular bottom plate (10), including connected and upward vertical sidewalls (101) on rear, left and right sides thereof, and a plurality of locating holes (12) in a lower part of an inner wall of the three sidewalls (101).

The building block base (2) is a quadrangular top plate (20), including connected and downward vertical sidewalls (201) on rear, left and right sides thereof. The building block base (2) can be placed on the base (1) and is enclosed by the three sidewalls (101). The three sidewalls (201) are vertically placed on the bottom plate (10) and retain a spacing between the top plate (20) and bottom plate (10) to form a holding space (23). The front sides of bottom plate (10) and top plate (20) form an opening (231). The outside of the three sidewalls (201) clings to the inside of the three sidewalls (101) of the base (1), and there are multiple clamping blocks (22 on the outer wall of three sidewalls (201), which can be fixed into the multiple locating holes 12. The plane of the top plate (20) has a crosswise spread bracket (25), which forms (25) perforations (21) arrayed in square matrix.

Figure 3:
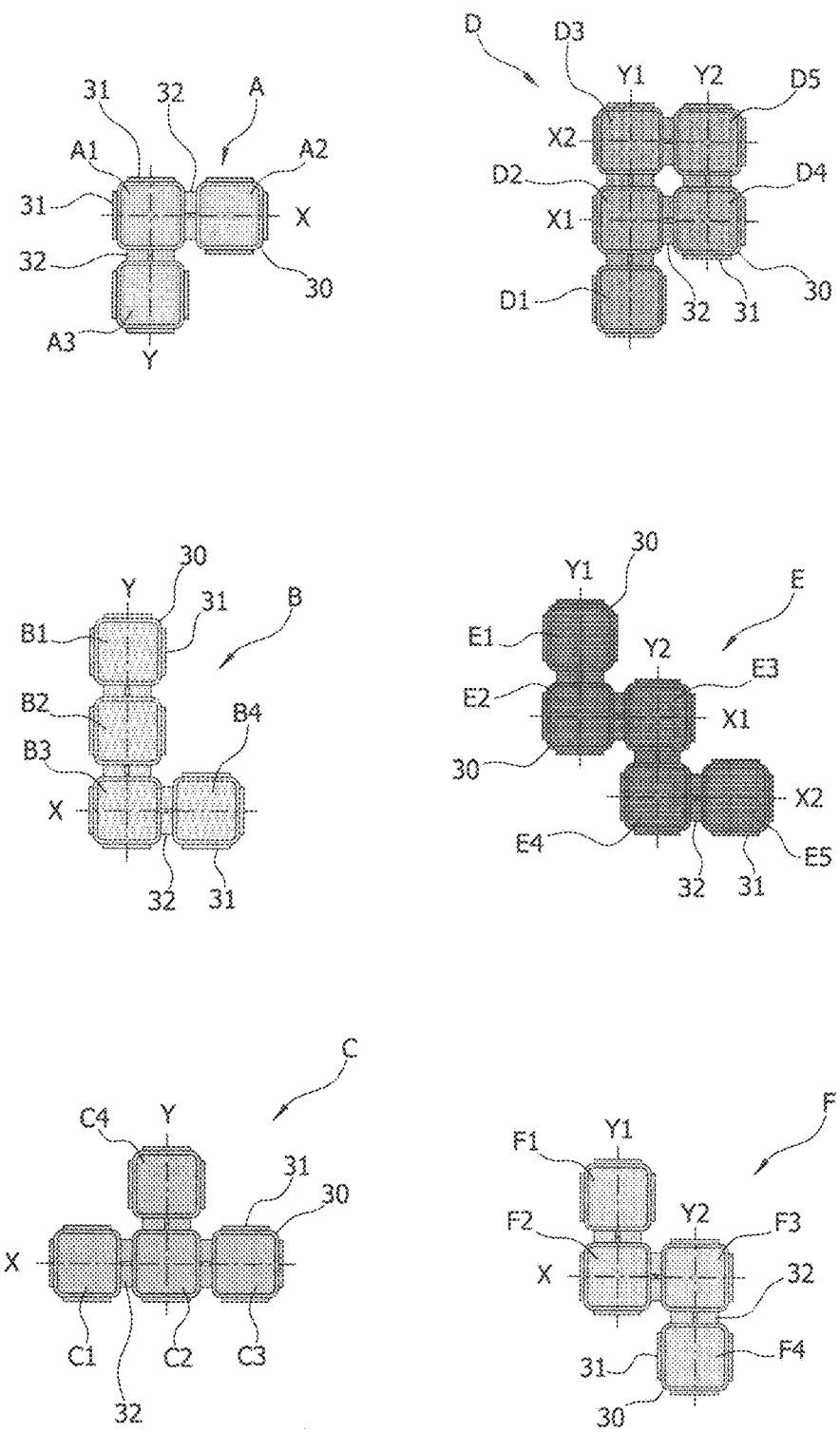
FIG. 3 is a plan view of six building blocks of the present invention.

The building block set (3) is shown in FIG. 3, composed of (6) building blocks A~F. Each building block comprises 3~5 block units (30), the block units are horizontally and vertically combined, and every two block units are connected by a narrow neck (32). The building block set (3) has 25 units, which can be laid in the (25) perforations (21) of the building block base (2), and there is a lug (31) on each outer wall of block unit (30) of 6 building blocks, which works with the bracket (25), so that when the block unit (30) is placed in the perforation (21), it will not fall off as stopped by the bracket (25).

Figure 4:
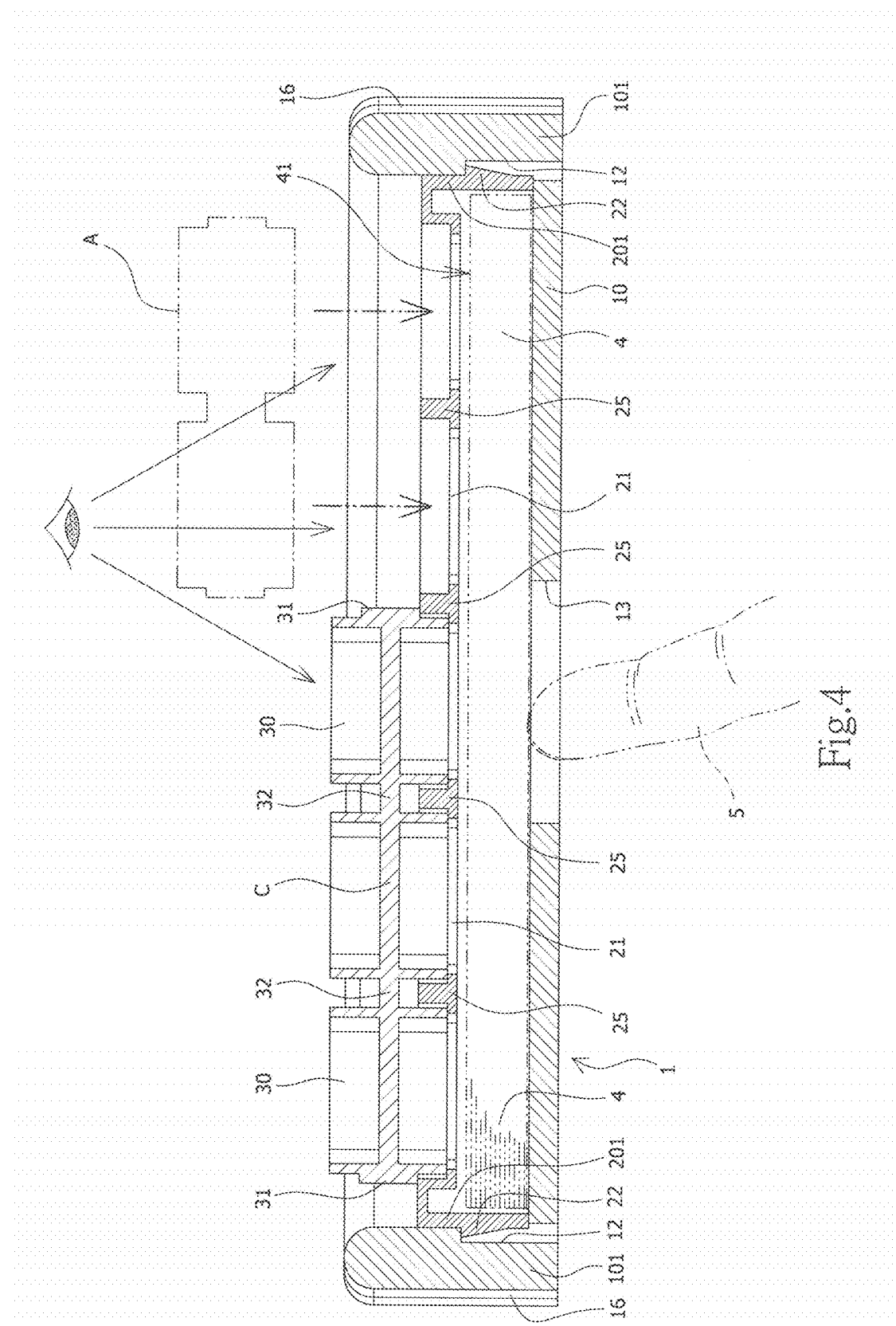
FIG. 4 is a cross-sectional view taken along line A-A of FIG. 1.

Referring to FIG. 1 and FIG. 4, the graph card (4) is a quadrangular card, one or multiple cards are stacked flat on the bottom plate (10) in the holding space (23). There is at least one mark (41) printed on the surface of the graph card (4). The mark (41) corresponds to the perforation (21) of the building block base (2) above, so that the user can see the graph card mark 41 in the holding space (23) clearly through the perforation (21).

The graph card (4) has at least one mark (41), and 25 at most. In FIG. 1, the first graph card (4) has 25 marks (41), the 25 marks (41) are connected by 3~5 color blocks (411)

respectively, forming 6 color block groups in different colors, and the colors of the 6 color block groups are identical with the shapes and colors of the 6 building blocks. Therefore, when the graph card (4) is put in the holding space (23), the 25 color blocks (411) are exactly below the 25 perforations (21) of the building block base (2), and the player can see the color of color block (411) below through the perforation (21) with naked eye, and can recognize the colors of 6 color block groups in different colors. Therefore, the player can lay the 6 building blocks according to the colors of color block groups easily, this is the easiest game for children.

The combination of building block set (3) and different graph cards (4) can result in different plays and changes. In other words, a graph card (4) represents a play, 100 graph cards (4) represent different difficulty levels, so as to attract the user to accept the challenge, and the brain is developed. The play is further described in subsequent explanatory FIGS. 7 and 8.

FIG. 2 shows that the bracket (25) of building block base (2) is formed of 4 longitudinal supports and 4 transverse supports crossed orthogonally, the formed 25 perforations (21) can hold the 25 block units (30) of the building block set (3), as shown in FIG. 4. The lug (31) on the outer surface of the block unit 30 can be held by bracket (25), so that the block unit (30) can be fixed into perforation (21) firmly. In other words, the building block set (3) can be located on building block base 2 steadily.

The clamping block (22) corresponds to the locating hole (12), when the clamping block (22) is inserted in the locating hole (12), the building block base (2) and base (1) are combined steadily, and there will not be any displacement or separation.

FIG. 2 shows a top cover (5) fitting the bottom plate (10) for covering the building block base (2). There are pivots (53) at both ends of the rear side of the top cover (5), which join the vertical pivot slots (18) preset at both ends of the rear side of the bottom plate (10) respectively, so that the top cover (5) can be lifted up and down. The base (1) is covered with top cover (5) to protect building block set (3), prevent dust and loss. When the top cover (5) is lifted up, the user can play the game by putting the 6 building blocks in the building block base (2) in succession. A blocking plate (51) for shielding the opening (231) extends downward from the front side of the top cover (5), to prevent the graph card 4 in the holding space (23 from falling off the opening (231).

As shown in FIG. 4, there is an open and backward extended gap (13) on the front side of bottom plate (10) of the base (1). The gap (13) allows the finger (6) to move the graph card (4) in the holding space (23) from the bottom up, and the finger (6) moves the graph card (4) over and over, so that the card can move outward through the opening (231), and the graph card (4) is changed to make another play.

As shown in FIG. 2, there are concave shallow slots (14) on the right and left sides of the gap (13) respectively. There are two stoppers (511) on the inner wall of bottom edge of the blocking plate (51). The two stoppers (511) can be fixed into the two shallow slots (14), when the top cover (5) covers the base (1) tightly, it will not be opened easily by shaking or collision, so as to prevent the building blocks from dropping off the building block base (2).

There is a convex shifting block (512) on the inner wall of bottom edge of the blocking plate (51) for the finger to push the top cover (5) up. The convex shifting block (512) is located between the two stoppers (511), corresponding to the gap (13). The convex shifting block (512) enables the user to push the top cover (5) easily. When the shifting block (512) is inserted in the gap (13), the top cover (5) is combined with base (1) tightly.

Figure 6:
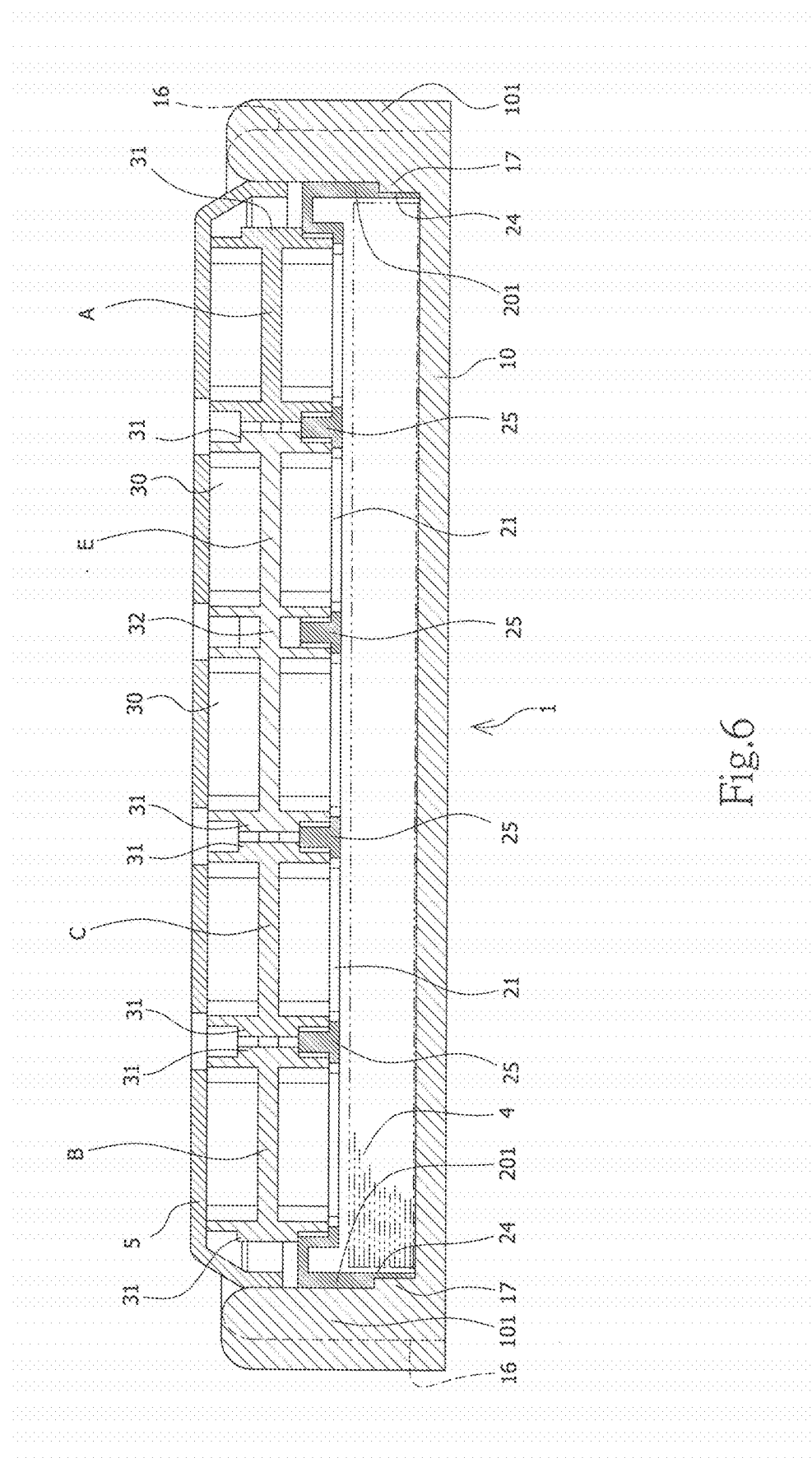
FIG. 6 is a cross-sectional view taken along line Q-Q of FIG. 5.

As shown in FIG. 2, there are small lugs (17) on the lower inner wall of three sidewalls (101) of the base (1). The small lug (17) is located between two locating holes (12). There are small grooves (24) in the lower outer wall of three sidewalls (201) of the building block base (2). The small grooves (24) is located between two clamping blocks (22). The small groove (24) corresponds to the small lug (17, they are combined for positioning, as shown in the sectional view of FIG. 6. Therefore, the building block base (2) is fixed by the small lug (17) and the small groove (24), the building block base (2) will not be separated from the base (1) by collision or shaking.

Figure 5:
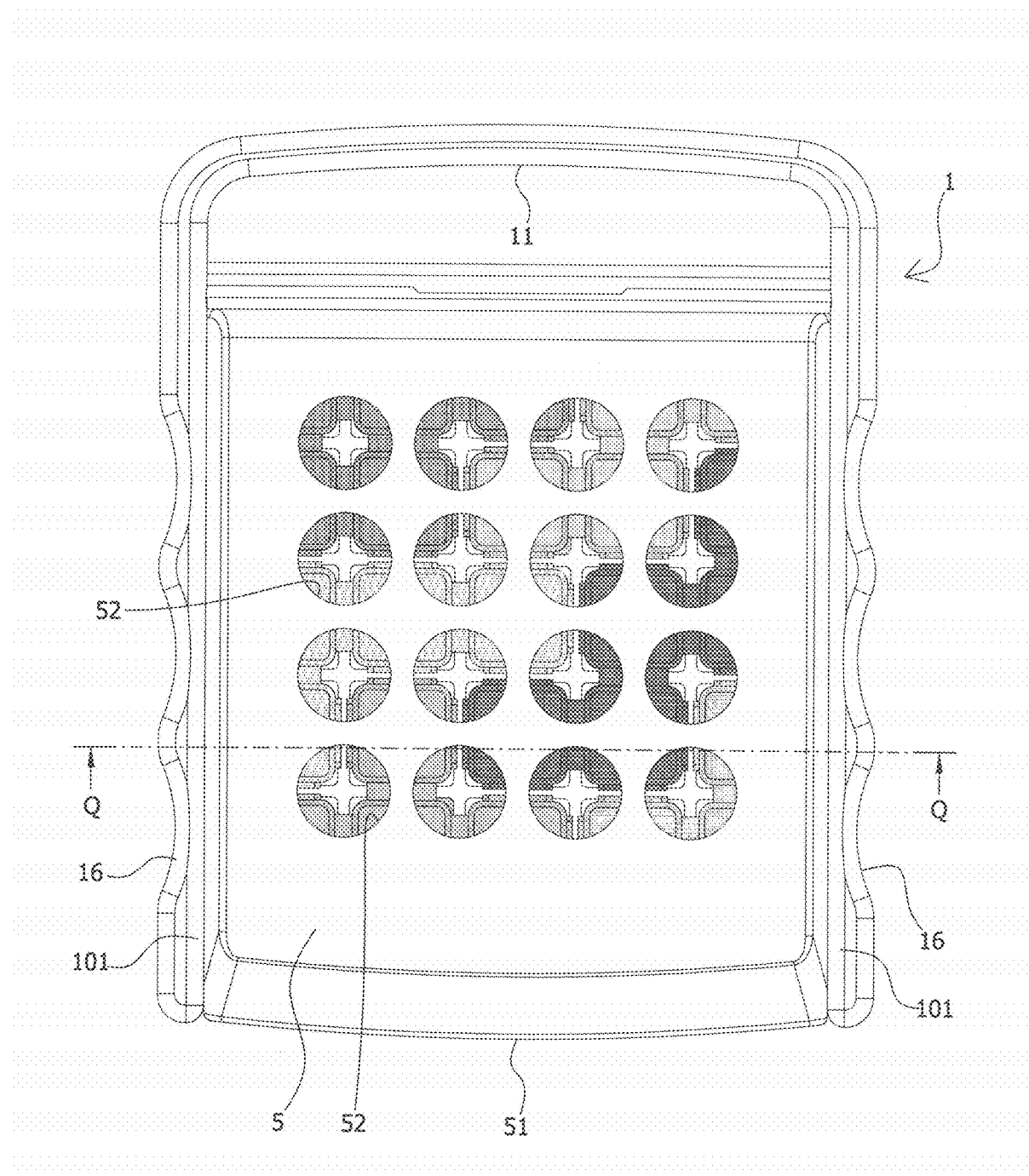
FIG. 5 is a top view of the intelligence toy of the present invention.

As shown in FIG. 5, there are 16 through holes (52) in the plane of the top cover (5), which are arranged in a 4×4 matrix. Therefore, the user can check whether the 6 building blocks (A~F) exist in the space between the base 1 and top cover (5) through the punch holes (152) with naked eye, to avoid incomplete collection and losses.

FIG. 1 and FIG. 2 show that the external surface of two sidewalls (101) of base (1) is wavy antiskid wall (16). The antiskid wall (16) enables the user to hold the base (1) in one hand without skid. There is a hand grip (11) on the rear side of the base (1). Both ends of the hand grip (11) are integrated with the base (1). The hand grip (11) implements portability.

The shapes of the building blocks (A~F) are shown in FIG. 3:

The building block A has 3 block units (30), which are unit A1~unit A3. The first unit A1 and the second unit A2 are connected on horizontal axis X. The first unit A1 and the third unit A3 are connected on vertical axis Y. The perpendicular intersection of X-axis and Y-axis is in the first unit A1.

The building block B has 4 block units (30), which are unit B1~unit B4. The first unit B1 to the third unit B3 are connected on vertical axis Y. The third unit B3 and the fourth unit B4 are connected on horizontal axis X. The perpendicular intersection of X-axis and Y-axis is in the third unit B3.

The building block C has 4 block units (30), which are unit C1~unit C4. The first unit C1 to the third unit C3 are connected on horizontal axis X. The second unit C2 and the fourth unit C4 are connected on vertical axis Y. The perpendicular intersection of X-axis and Y-axis is in the second unit C2.

The building block D has 5 block units (30), which are unit D1~unit D5. The first unit D1 to the third unit D3 are connected on the first vertical axis Y1. The fourth unit D4 and the fifth unit D5 are connected on the second vertical axis Y2. The second unit D2 and the fourth unit D4 are connected on the first horizontal axis X1. The third unit D3 and the fifth unit D5 are connected on the second horizontal axis X2. The first vertical axis Y1 is parallel to the second vertical axis Y2. The first horizontal axis X1 is parallel to the second horizontal axis X2.

The building block E has 5 block units (30), which are unit E1~unit E5. The first unit E1 and the second unit E2 are connected on the first vertical axis Y1. The third unit E3 and the fourth unit E4 are connected on the second vertical axis Y2. The second unit E2 and the third unit E3 are connected on the first horizontal axis X1. The fourth unit E4 and the fifth unit E5 are connected on the second horizontal axis X2. The first vertical axis Y1 is parallel to the second vertical axis Y2. The first horizontal axis X1 is parallel to the second horizontal axis X2.

The building block F has 4 block units (30), which are unit F1~unit F4. The first unit F1 and the second unit F2 are connected on the first vertical axis Y1. The third unit F3 and the fourth unit F4 are connected on the second vertical axis Y2. The second unit F2 and the third unit F3 are connected on the horizontal axis X. The first vertical axis Y1 is parallel to the second vertical axis Y2.

Figure 7:
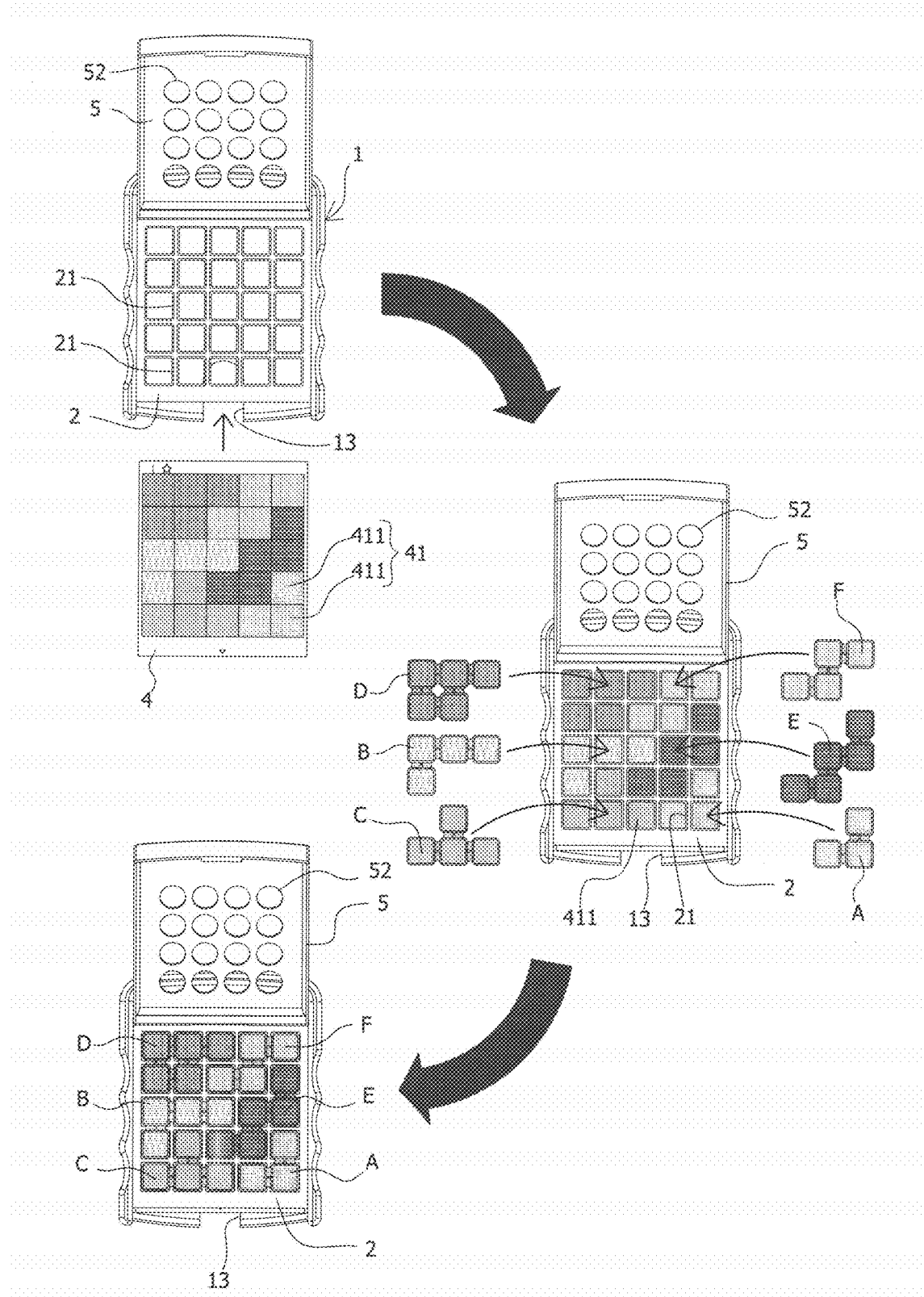
FIG. 7 is a schematic diagram of use of the present invention.

There are multiple play methods of the present invention, please see FIG. 7. The upper left part shows that the flat graph card (4) can be inserted in the holding space (23) between base (1) and building block base (2), as shown in the right part. The user can see the graph card mark (41) through the perforation (21) of building block base (2) with naked eye. As the mark (41) uses color blocks (411) in different colors as game clues, the user sees the colors of 25 color blocks (411) on graph card (4) through the perforations (21), and puts the 6 building blocks in the 25 perforations (21) of building block base (2) successively according to the colors. The player can place the 6 building blocks easily according to the colors of the color blocks (411), so the game is very easy. In this example, the 25 color blocks 411 comprise 6 color block groups in different colors. As the colors and shapes are identical with 6 building blocks, the player can place the 6 building blocks easily according to the colors and shapes of 6 color block groups. As the game difficulty level is low, it is easy for 3-6 years old children to comprehend and handle.

Figure 8:
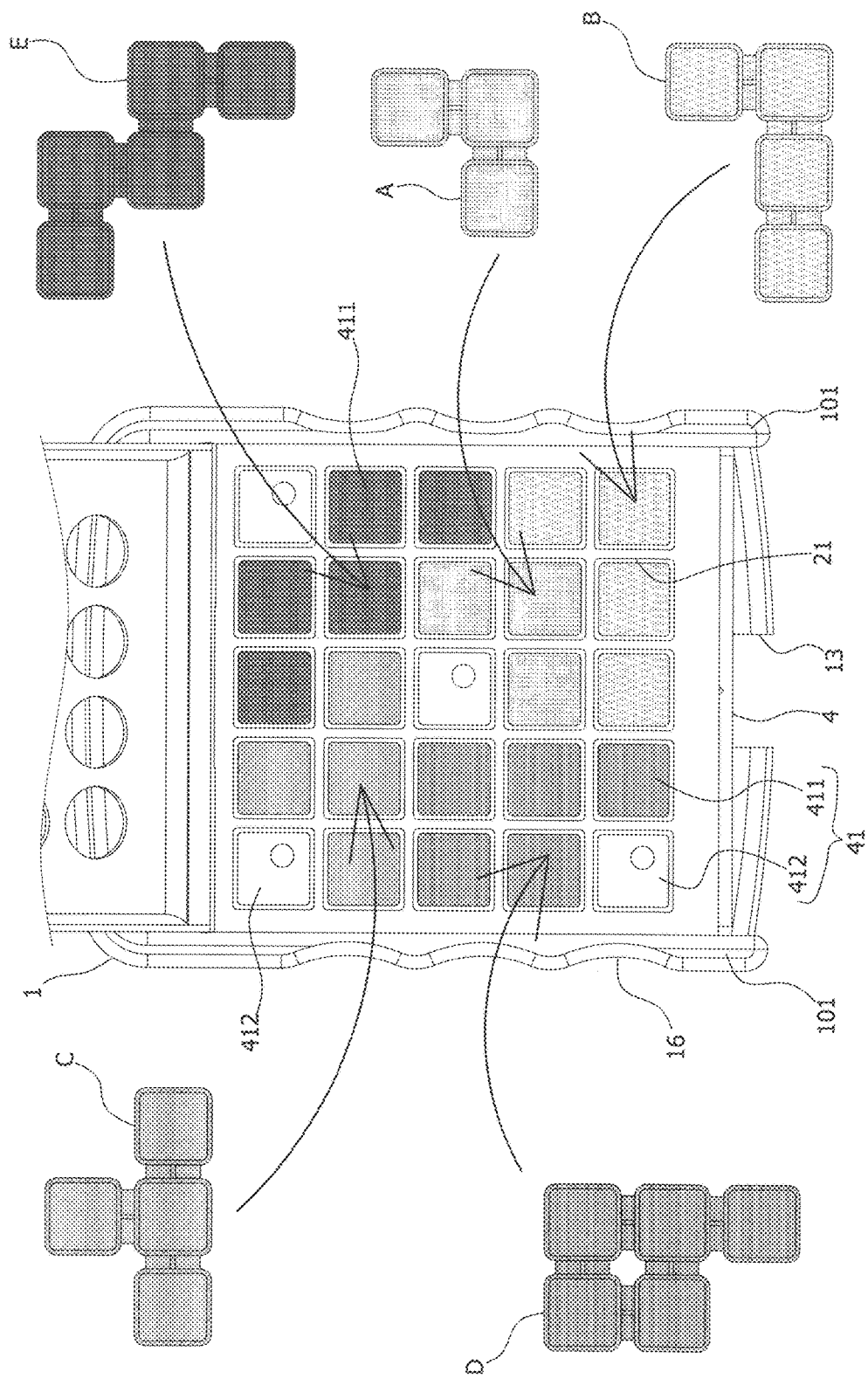
FIG. 8 is another schematic diagram of use of the present invention.

As shown in FIG. 8, the mark (41) is used as obstacle point (412) in game, the unmarked part is blank, i.e. obstacle-free point. The obstacle point (412) prevents any of building block A-building block F from being put in the perforation (21) above obstacle point (412). Therefore, the user must think about how to avoid placing the building block in the perforation (21) corresponding to obstacle point (41.2) when placing building blocks, and think about how to put the building block in the area without obstacle point. In this example, there are 4 obstacle points (412), the other 21 perforations must be filled with building blocks. The perforations can be filled up with 5 building blocks: building block A-building block E. The building block F is not filled in. Therefore, the user must keep trying before the final answer is obtained. This game is relatively difficult, it can be an advanced play for 3-6 years old children. The difficulty level increases with the number of obstacle points (412). Different locations of obstacle points (412) result in different difficulty levels, suitable for developing the children's brain.

As shown in FIG. 1, there is a symbol (42) printed at the corner of the surface of the graph card (4), the quantity of the symbols represents the difficulty level of game. There is a serial number (43) printed on one side of the symbol (42), which represents the sequence of graph card (4). Therefore, the user can know the difficulty level of the graph card (4) according to the symbol (42), and then select the appropriate graph card for game. In this example, the symbol (42) is "☆", one symbol (42) means the game is easy, two symbols (42) means the game is a little difficult, three symbols (42) means the game is very difficult. The difficulty level of the graph card (4) can be known from the quantity of symbols (42). The serial number (43) tells the user the serial number of current graph card 4 among all graph cards. The serial number (43) can be number 1 to 50 or 100. The number 100 means there are 100 graph cards (4), the serial number (43) lets the player know whether the graph cards (4) are complete and whether there are losses or not.

Figure 9:
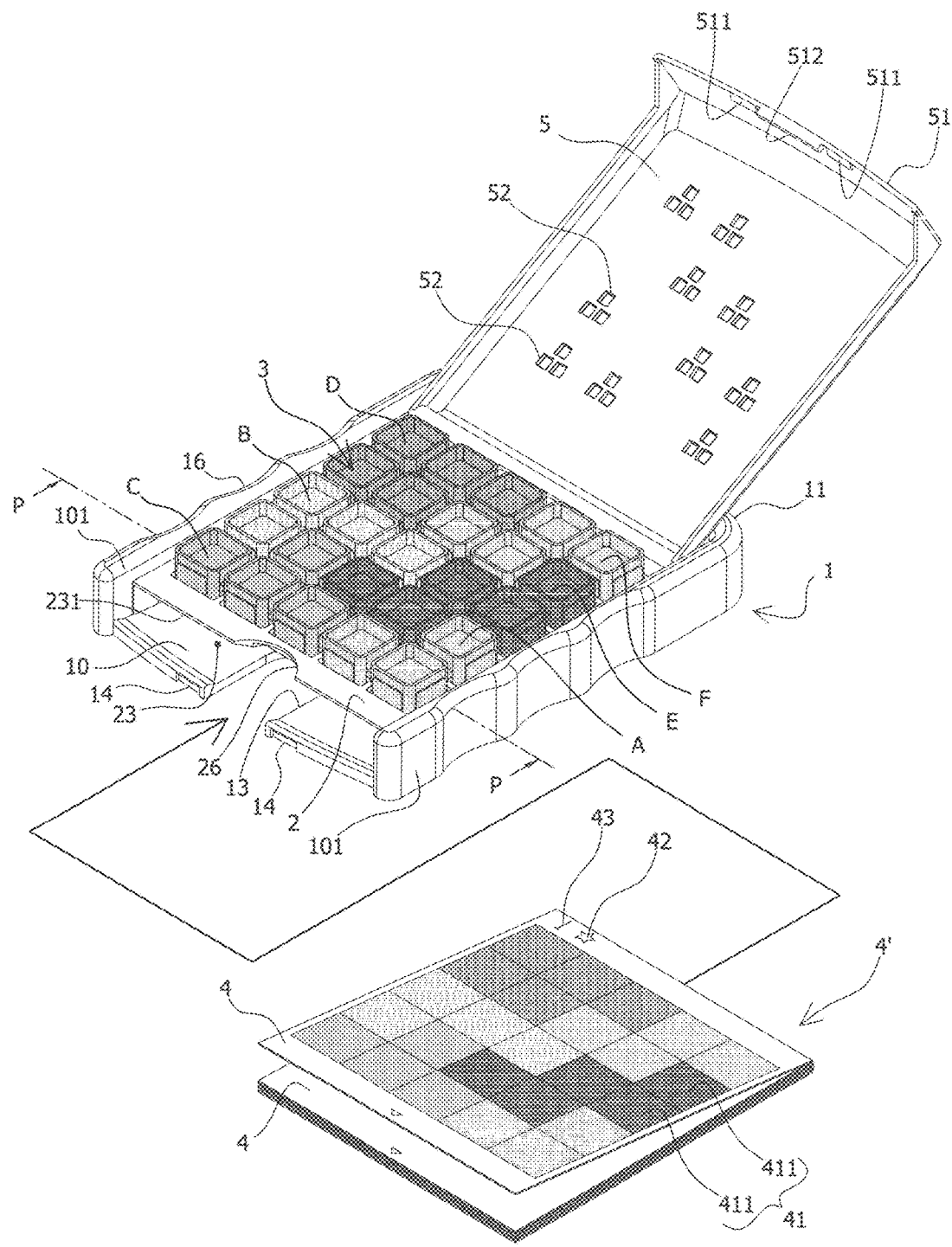
FIG. 9 is another three-dimensional schematic diagram of the intelligence toy and atlas of the present invention.

Finally, FIG. 9 shows the embodiment of another intelligence toy and atlas, compared with FIG. 1, the differences are: there is a concave semicircular nock (26) in the front edge of building block base (2), the nock (26 corresponds to the gap (13) of the base (1), so that the operator can grip graph card (4) with two fingers easily. In addition, multiple graph cards (4) can be integrated into a book, fixed by glue, paster, rubber ring or machine sewing on one side to make an atlas 4'. Therefore, the operator can turn the head page to the bottom of atlas 4', the second page becomes the head page as subject card. In the same way, a page can be selected as head page, all of the graph cards above the page are turned to the bottom of atlas 4', so that the page becomes subject card. The implementation of atlas 4' is easy for collection, preventing fallout or losses of graph cards 4. Secondly, the shape, position and quantity of through holes (52) in the surface of top cover (5) are arbitrary. For example, square holes, concentrating in a position, three holes as a group and so on. The settings are not restricted.

The above only describes some exemplary embodiments of the present invention. Those having ordinary skills in the art may also make many modifications and improvements without departing from the conception of the invention, which shall all fall within the protection scope of the invention.

I claim:

1. An intelligence toy used with graph cards, comprising:
   a base (1) which is a quadrangular bottom plate, including three connected and upward vertical sidewalls (101) on rear, left and right sides thereof, and a plurality of locating holes (12) in a lower part of an inner wall of the three sidewalls (101);
   a building block base (2) which is a quadrangular top plate, including three connected and downward vertical sidewalls (201) on rear, left and right sides thereof; wherein the building block base (2) can be placed on the base (1) and is enclosed by the three sidewalls (101) of the base (1); the three sidewalls (201) of the building block base (2) are vertically placed on the bottom plate (10) and retain a space between the top plate (20) and bottom plate (10) to form a holding space (23); the bottom plate (10) and top plate (20) form an opening (231) disposed at front sides thereof; the three sidewalls (201) of the building block base (2) having an outer side is attached to an inner side of the three sidewalls (101) of the base (1) and the outer side of the three sidewalls (201) includes a plurality of clamping blocks (22) configured to fix into the locating holes (12); the top plate (20) has a crosswise spread bracket (25), which forms twenty five perforations (21) arrayed in square matrix;
   a building block set (3) being composed of six building blocks (A~F) and each building block be composed of three to five block units (30), wherein the block units (30) are horizontally and vertically combined, and every two block units (30) are connected by a narrow neck (32); the building block set (3) has twenty five units, which can be laid in the twenty five perforations (21) of the building block base (2); the six building blocks (A~F) include a lug (31) on each outer wall of the block unit (30), which allows each block unit (30) to fall into the perforations (21) and be blocked by the bracket (25) without falling off; and
   at least one graph card (4) which is a quadrangular card and is placed on the bottom plate (10) in the holding space (23), including at least one mark (41) printed on a surface thereof, wherein the mark (41) corresponds to the perforation (21) of the building block base (2) above and is visible through the perforation (21).

2. The intelligence toy used with graph cards according to claim 1, wherein the six building blocks (A~F) include:
- a building block A having three block units (30), which are unit A1~unit A3, wherein the first unit A1 and the second unit A2 are connected on horizontal axis X; the first unit A1 and the third unit A3 are connected on vertical axis Y; the perpendicular intersection of X-axis and Y-axis is in the first unit A1;
- a building block B having four block units (30), which are unit B1~unit B4, wherein the first unit B1 to the third unit B3 are connected on vertical axis Y; the third unit B3 and the fourth unit B4 are connected on horizontal axis X; the perpendicular intersection of X-axis and Y-axis is in the third unit B3;
- a building block C having four block units (30), which are unit C1~unit C4, wherein the first unit C1 to the third unit C3 are connected on horizontal axis X; the second unit C2 and the fourth unit C4 are connected on vertical axis Y; the perpendicular intersection of X-axis and Y-axis is in the second unit C2;
- a building block D has having block units (30), which are unit D1~unit D5, wherein the first unit D1 to the third unit D3 are connected on a first vertical axis Y1; the fourth unit D4 and the fifth unit D5 are connected on a second vertical axis Y2; the second unit D2 and the fourth unit D4 are connected on a first horizontal axis X1; the third unit D3 and the fifth unit D5 are connected on a second horizontal axis X2; The first vertical axis Y1 is parallel to the second vertical axis Y2; the first horizontal axis X is parallel to the second horizontal axis X2;
- a building block E having five block units (30), which are unit E1~unit E5, wherein the first unit E1 and the second unit E2 are connected on the first vertical axis Y1; the third unit E3 and the fourth unit E4 are connected on the second vertical axis Y2; the second unit E2 and the third unit E3 are connected on the first horizontal axis X1; the fourth unit E4 and the fifth unit E5 are connected on the second horizontal axis X2; the first vertical axis Y1 is parallel to the second vertical axis Y2; the first horizontal axis X1 is parallel to the second horizontal axis X2;
- a building block F having four block units (30), which are unit F1~unit F4, wherein the first unit F1 and the second unit F2 are connected on the first vertical axis Y1; the third unit F3 and the fourth unit F4 are connected on the second vertical axis Y2; the second unit F2 and the third unit F3 are connected on the horizontal axis X; the first vertical axis Y1 is parallel to the second vertical axis Y2.

3. The intelligence toy used with graph cards according to claim 1, including a top cover (5) fitting the bottom plate (10) for covering the building block base (2), a blocking plate (51) extending downward from a front side of the top cover (5) for shielding the opening (231), and pivots (53) disposed at both ends of a rear side of the top cover (5), wherein the pivots (5) are respectively pivotally connected with vertical pivot slots (18) disposed at both ends of a rear side of the bottom plate (10).

4. The intelligence toy used with graph cards according to claim 1, wherein the bottom plate (10) of the base (1) includes an open and backward extended gap (13) disposed at the front side thereof, and recessed shallow slots (14) disposed at right and left sides of the gap (13) respectively; the blocking plate (51) includes two stoppers (511) disposed on an inner wall of a bottom edge thereof and configured to be fixed into the shallow slots (14), and a convex shifting block (512) disposed on the inner wall of the bottom edge thereof, arranged between the two stoppers (511), and corresponding to and can be inserted into the gap (13).

5. The intelligence toy used with graph cards according to claim 3, wherein the top cover (5) includes a plurality of through holes (52) disposed in a surface of the top cover (5) for visually observing the six building blocks (A~F) on the building block base (2).

6. The intelligence toy used with graph cards according to claim 1, wherein the base (1) includes undulating anti-slip walls (16) disposed on an external surface of two sidewalls (101).

7. The intelligence toy used with graph cards, according to claim 1, wherein the three sidewalls (101) of the base (1) include small lugs (17) disposed on the lower inner wall thereof and arranged between two locating holes (12); the three sidewalls (201) of the building block base (2) include small grooves (24) disposed at the lower outer wall thereof and arranged between two clamping blocks (22); the small lugs (17) correspond to and are fixed to the small grooves (24).

8. The intelligence toy used with graph cards, according to claim 1, wherein the base (1) includes a hand grip (11) disposed on the rear side thereof; both ends of the hand grip (11) are integrated with the base (1).

9. The intelligence toy used with graph cards, according to claim 1, wherein the mark (41) is one of the following: when in game, the mark is used as a color block (411), indicating the positions of the building blocks (A~F) and being the same color as the building blocks; or the mark is used as a pattern (412), hindering the placement of the building blocks (A~F).

10. The intelligence toy used with graph cards, according to claim 1, wherein the graph card (4) includes a symbol (42) printed at a corner of a surface thereof, wherein the quantity of the symbol (42) represents the degree of difficulty of the game; and a serial number (42) printed on one side of the symbol (42) for indicating the arrangement of the graph card (4).

* * * * *